United States Patent
Rossi et al.

(10) Patent No.: US 7,904,191 B2
(45) Date of Patent: Mar. 8, 2011

(54) PROCESS FOR DYNAMIC AUTOMATION WITH COLLABORATIVE ELEMENTS AND CONTROL SYSTEM THEREFOR

(75) Inventors: Roberto Rossi, Freienstein (CH); Felix H. Wullschleger, Zurich (CH)

(73) Assignee: Logobject AG, Zurich (CH)

( * ) Notice: Subject to any disclaimer, the term of this patent is extended or adjusted under 35 U.S.C. 154(b) by 1352 days.

(21) Appl. No.: 10/536,023

(22) PCT Filed: Dec. 5, 2003

(86) PCT No.: PCT/CH03/00803
§ 371 (c)(1),
(2), (4) Date: Jan. 27, 2006

(87) PCT Pub. No.: WO2004/053605
PCT Pub. Date: Jun. 24, 2004

(65) Prior Publication Data
US 2006/0155406 A1    Jul. 13, 2006

(30) Foreign Application Priority Data

Dec. 10, 2002   (CH) ..................................... 2116/02

(51) Int. Cl.
*G06F 19/00* (2006.01)
(52) U.S. Cl. ............ 700/99; 700/100; 700/113; 700/245
(58) Field of Classification Search .................... 700/99, 700/100, 245, 248, 95, 96, 112, 113, 247; 318/568.11, 568.12; 29/711
See application file for complete search history.

(56) References Cited

U.S. PATENT DOCUMENTS

| | | | | |
|---|---|---|---|---|
| 4,815,190 A * | 3/1989 | Haba et al. | ..................... | 29/701 |
| 4,850,104 A * | 7/1989 | Matrone et al. | .................. | 29/829 |
| 4,894,908 A * | 1/1990 | Haba et al. | ..................... | 29/711 |
| 5,539,975 A * | 7/1996 | Kukuljan et al. | ............... | 29/711 |
| 5,825,981 A | 10/1998 | Matsuda | | |
| 6,105,242 A * | 8/2000 | Miyasaka et al. | ............... | 29/784 |
| 6,463,360 B1 * | 10/2002 | Terada et al. | .................. | 700/257 |

FOREIGN PATENT DOCUMENTS

| | | |
|---|---|---|
| EP | 0 700 841 B1 | 3/1996 |
| JP | 10101222 A | 4/1998 |
| JP | 10-244431 | 9/1998 |

OTHER PUBLICATIONS

International Search Report dated Apr. 7, 2004 for International Application No. PCT/CH2003/000803.

* cited by examiner

*Primary Examiner* — Charles R Kasenge
(74) *Attorney, Agent, or Firm* — Buchanan Ingersoll & Rooney PC

(57) ABSTRACT

The invention relates to a method for dynamic automation, in which collaborative elements, such as humans and mobile robots, but also machines, co-operate, in order to carry out tasks as efficiently as possible. Each of said collaborative elements carries out a part of a working process which exploits the concept of collaboration the most in terms of efficiency, flexibility, quality and performance. The invention also relates to a control system for carrying out said method. The inventive method can be applied in logistics, especially storage logistics, such as commissioning.

22 Claims, 2 Drawing Sheets

PROCESS FOR DYNAMIC AUTOMATION WITH COLLABORATIVE ELEMENTS AND CONTROL SYSTEM THEREFOR

FIELD

1. Related Applications

This application claims priorities under 35 U.S.C. §119 to Switzerland Application No. 2116/02 filed Dec. 10, 2002, and Under 35 U.S.C. §371 to PCT Application No. PCT/CH2003/000803 filed as an International Application on Dec. 5, 2003 designating the U.S., the entire contents of which are hereby incorporated by reference in their entireties.

2. Background

This invention relates to a process for dynamic automation with collaborative elements according to a first exemplary aspect, and a control system for executing the process according to a second exemplary aspect.

Automation of industrial processes, especially of logistical process, to date has been hallmarked by the following:

special fully automatic systems: They are systems which execute certain processes fully automatically. In these systems no individuals are present. The performance features of these machines are given and can only be changed with very great effort. Examples of these systems are high-bay warehouses, sorters and in general, conveyor systems.

Production lines: The latter correspond largely to the work organization of Ford. The production of articles of industrial processes follows fixed, defined routes. On these routes fixed positions are defined at which the individual operations are carried out. These operations can be carried out with human aid or fully automatically, by suitable systems.

Examples of this are the services of the following providers:

Swisslog: (www.swisslog.com)
Siemens Dematic: Analogous to Swisslog (www.siemensdematic.com/corp/en/index.php)
AFT: (www.aft.de)

Another example of transport systems is HELPMATE$^R$, the trackless robotic courier (http://www.helpmate.com/products/helpmate.asp). This transport system is able to distribute a commodity in environments in which humans are also working. The task of the robot in this case is to attend the given positions. The actual distribution of the commodity is then undertaken by humans. Helpmate does not constitute an actively controlling element of an industrial process, but waits passively at the attended position.

Disadvantages of Known Systems:

The space which is occupied by automatic systems is prepared only for the automatic components. The presence of humans is therefore greatly hindered and in any case causes a disruption of the system. Current automatic systems call for defined zones in which man and machine can interact. These zones are static and in no case is it possible for individuals and machines to be able to move independently and autonomously at the same time. The space for driverless transport systems (FTS) is prepared for example such that the carriage ways are reserved for the movements of FTS. Thus the perception of obstacles of any type (including the presence of an individual) is processed as a disruption. This proves disadvantageous because in this way interruptions in operations, or dead times, generally arise.

SUMMARY

The object of this invention is to propose a process for dynamic automation in which the cited disadvantages are eliminated and which is characterized by its efficiency.

Another object is to devise a control system for executing the process therein.

The object is achieved by a process for dynamic automation according to a first exemplary aspect, and by a control system for dynamic automation according to a second exemplary aspect.

An exemplary process of the invention is based on collaboration between humans and machines, with the following characteristics.

The work space is accessible at any time both to humans and also to mobile robots;

the origin of articles from industrial processes is the mobile robot which navigates autonomously and freely in the work space;

the execution zone is dynamically determined. Robots, the resources which are necessary for the execution, and humans meet there. The humans move autonomously here;

cooperation is initiated by the mobile robot at the execution area and the corresponding information is actively communicated in the local environment by the robot.

The process and the pertinent control system are described below.

DETAILED DESCRIPTION OF EXEMPLARY EMBODIMENTS

Figure 1:
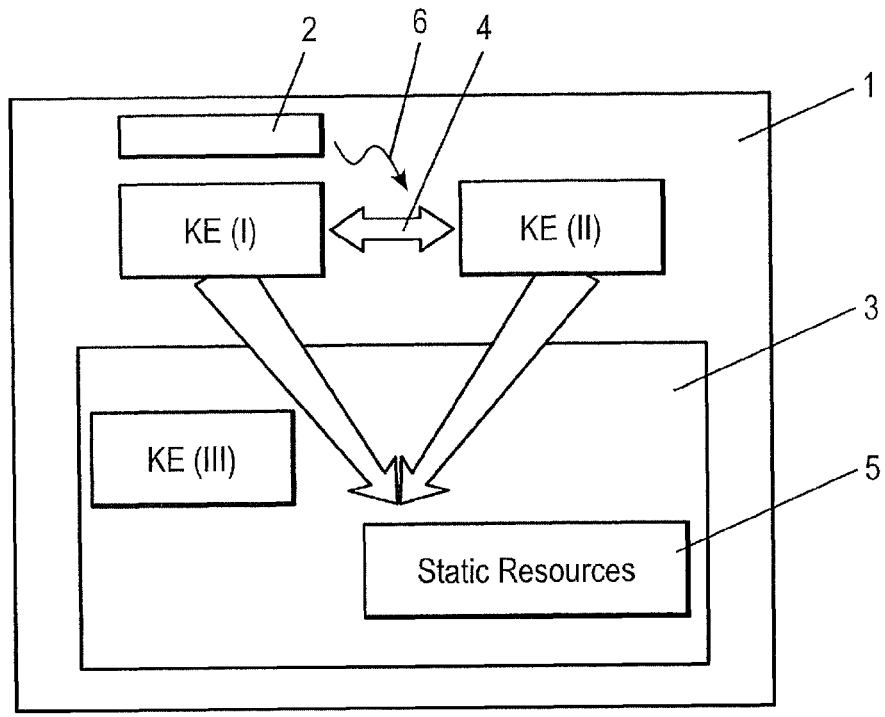
FIG. 1 shows a schematic of one working step

The heart of the invention is a process which calls for collaborative elements, such as essentially humans or individuals and mobile robots, but also automatic devices, which cooperate with one another in order to efficiently perform set tasks, or job processing, as efficiently as possible.

The basic principle is based on the fact that there is a division of labor between man and mobile robots, these two collaborative elements moving autonomously in the work space or in the space. This concept occurs at present mainly in cooperation between humans and in part also between automatic devices, but not between man and machine.

In the division of tasks, according to an exemplary embodiment of the invention, between man and robots it is considered that each of these collaborative elements executes exactly that part of an operation which most uses collaboration with respect to efficiency, flexibility, quality and performance.

In this invention the following terms are defined:

01. A space is the work space in which dynamic automation is implemented.

02. A collaborative element is one component of a working step.

03. A collaborative element of type I, KE(I) is a robot, generally made as a transport system, which can navigate in a mobile, autonomous and free manner. The robot is the location at which the article of a task originates. Moreover the robot is able to transport static resources.

04. A collaborative element of type II, KE(II) is a human or an individual; the human can move freely and autonomously in the space and in this process he constitutes a mobile resource.

05. A collaborative element of type III, KE(III) is an automatic device or a machine which is used for one working step and is generally not transportable, i.e. is installed fixed.

06. An execution zone is a zone of space in which collaborative elements meet in order to perform a working step.

07. A working step is the arrival of at least one collaborative element of type I and of at least one collaborative element of type II and/or at least one collaborative element of type III in an execution zone in order to handle one task item.

08. An operation is the set of all working steps which are necessary to handle a task.

09. Communications media are the totality of communications possibilities between KE(I), KE(II), and KE(III).

10. A partial article is the product of one working step.

11. An article is the sum of partial articles and the product of a task, and a task can also comprise several articles.

12. The current state of a collaborative system is the current locations of all KE(I) and KE(II), the status, (free, occupied, disruption, pause, etc.) of all KEs, the current inventory and location of all goods in the space and the degree of execution of all known tasks and task items.

13. A task describes a logical and logistical unit which is to be supplied. The task is provided with a deadline (time, date): By when must the unit be supplied. The task contains information about who must receive this unit. The execution of a task produces a set of articles.

14. A task item is a part of a task and describes one working step for supply and production of a unit. It contains the information which resources are required to execute the working step: commodity and/or equipment. In the description of the task item the result of this working step is exactly established.

Each task item is assigned a sequence number which describes when a working step must be executed within a task: Which task items absolutely must be executed prior to the current task item; which task items absolutely must be executed after the current task item; which task items can be selectively executed prior to or following this task item. The sequence numbers of all task items of a task thus mathematically form a partially ordered set.

15. Static resources are resources which are used in the execution of a task and the location of which in space determines the execution zone. They can be transported using KE(I), but not during the execution of a working step.

16. Mobile resources are resources which move autonomously in the execution of a task or which are transported by autonomous mobile robots. These resources are thus moved autonomously to the execution zone directly before the execution of a working step.

17. Fixed resources are resources which cannot be transported (for example, a painting robot, a warehouse).

18. A commodity is a resource which is consumed for the execution of a task item: After execution, this resource is not available for any other task.

19. Equipment is a resource which is not consumed: after execution of a task item it is available for other tasks (for example, a tool).

20. Dynamic: Any assignment takes place at the latest possible instant or deadline with additional consideration of the current state of the collaborative system.

FIG. 1 shows a schematic of one working step. In a space 1 there is one collaborative element of type I KE(I), a mobile robot which is guided and controlled or ordered by means of a control system 2 into an execution zone 3. The control system 2 is generally located in the space 1 and is equipped with a bidirectional system for wireless transmission 6 of all information, tasks and acknowledgements; this is indicated by an arrow. Advantageously the control system can however also be located on the KE(I), the mobile robot. In this case transmission to the KE(I) can take place at least partially by wire. The execution zone 3 is located in the space and is a region or a zone of this space in which collaborative elements meet in order to perform one working step or to perform the task established in the working step. A collaborative element of type I KE(I) can move freely and autonomously in space. An exception is recessed surfaces with obstacles, such as, for example, shelves, storage cabinets, barriers and the like, but also obstacles such as individuals. To move "freely" here means that the KE(I) is moving or navigating "wherever it intends"; "autonomously" means that the KE(I) is moving "independently", as is explained below.

Instructed and guided by the control system, the KE(I) moves toward the execution zone. Upon arrival in the execution zone or advantageously beforehand, for example en route to the execution zone, a collaborative element of type II KE(II), a human or an individual, who is proceeding into the execution zone at the time, is requested by the KE(I) with instructions from and by way of the control system via communications media 4, to then receive further tasks after arrival. As soon as KE(I) and KE(II) have arrived in the execution zone, KE(II) receives the instruction to carry out the partial production step with the incorporation of static resources 5 which are used in the execution of the working step. This instruction can for example read such as "place two packs of screws in a shipping unit", the shipping unit being located on KE(I), the mobile robot. The execution of this instruction is monitored by KE(I). After error-free handling, all collaborative elements are released for further tasks. With this release the working step is completed. The partial article of this operating step is located on the KE(I) and has been formed on the latter. Thus KE(I) is the origin of the partial article.

The working step can also comprise a collaborative element of type III, KE(III), an automatic device, or a machine, which is also located in the execution zone. A KE(III) is generally not transportable, i.e. is installed fixed, such as for example a labelling machine, winding machine, painting robot.

Since the human and the mobile robots move autonomously, the process according to an exemplary embodiment of the invention presupposes the following requirements or prerequisites:

Space: Humans and mobile robots must be able to move safely in the same space. The space must be prepared such that the robots can navigate independently and orient themselves autonomously;
  the robots can unambiguously identify both humans as well as the other robots;
  the free movement of humans is allowed at any time;
  the different locations of humans in space at any time are known to the robots.

These tasks are all imposed on the control system.

Navigation: the autonomous mobile robots must be able to navigate in space such that the presence of humans is considered at the same time and does not lead to disruptions which must then be eliminated manually by humans: The presence of a human can cause a mobile robot to stop for reasons of space. But as soon as the human is moving such that continuation is possible, the robot is able to autonomously restart his navigation.

The mobile robot "meets" humans in the space in order to perform a joint task or a working step with their aid or collaboration. Therefore it is necessary for the robots to be able to autonomously follow a certain individual. Navigation must be configured such that the mobile robot can avoid all obstacles, especially all those individuals who are at that instant not cooperating with the robot.

Thus, the process according to an exemplary embodiment of the invention differs from known systems. Most vehicles moving in automatic systems move either on tracks (shelf servicing devices, monorails) or on fixed paths. This applies to driverless transport systems (FTS) including Laser Guided AGV (laser guided vehicles). The path is permanently defined in the corresponding software. The presence of obstacles leads to disruptions. Driverless transport systems are not able to autonomously follow humans.

Communication: Collaboration between man and robots takes place in the space and not at a predefined, fixed location. The location of the collaboration (execution zone) is dynamically computed based on the current state of the overall operation.

Since individuals can move independently of robots, it is necessary for there to be a suitable communications infrastructure between the robots and individuals. This supports the punctual meeting of the two collaborative elements (human/robot). After the meeting of an individual and robots, during the working step in turn intensive communication or interaction takes place. In this process the individual receives from the robot on the one hand the necessary information to execute the working step. On the other hand, the robot also monitors the working step and immediately notifies the individual if an error occurs in its execution.

These two communications flows should be configured such that they take place as efficiently and intuitively as possible for the human, but at the same time the information flow is also delivered promptly and with relative accuracy and reliability. This requirement presupposes that as many communications media as possible are being used in parallel, such as for example, voice, optical signals, acoustic signals, video, body language.

Thus, the process according to an exemplary embodiment of the invention in turn differs from known systems. They do not have the aforementioned demands for communications with humans. One main reason for this is that the interaction between man and machine takes place at locations in the space which are fixed, relative to the machine.

In the process described so far, the collaborative elements form the basis for cooperation between humans and mobile robots. It has been postulated that autonomously moving humans meet autonomously moving robots at certain locations and together execute a working step. As soon as this joint working step has been completed, both the human and also the mobile robot are available again for other tasks or released: The human can execute another working step or another task item of another operation or task and the mobile robot can prepare itself for the next step of the same operation.

Figure 2:
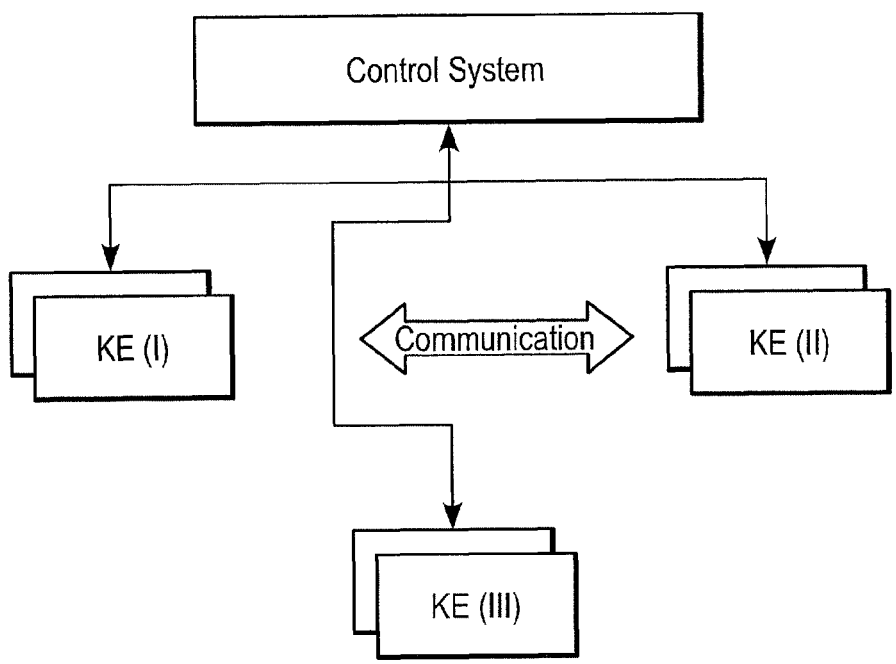
FIG. 2 shows a schematic of the architecture of dynamic automation

FIG. 2 shows a schematic of the architecture of dynamic automation.

Generally the collaborative system consists of a set of collaborative elements of type I, KE(I). i.e. of autonomous robots and of a set of collaborative elements of type II, KE(II), i.e. autonomous humans, which jointly execute several operations in a space. In doing so, optionally a set of collaborative elements of type III, KE(III), i.e. automatic devices, can collaborate, or can be or become involved. All collaborative elements are bidirectionally in communications with the control system. Between KE(I) and KE(II) the information flow is ensured by means of the communications media. On the system level thus the following new task assignments arise:

Which operation must be executed next by which robot;
which working step must an individual execute next, i.e. where is which individual needed for what and when.

These two task assignments are performed with consideration of maximizing the performance of the entire collaborative system (incl. the KE(III)) with the following criteria:

maximization of the number of operations which can be executed by the system per unit of time;
minimization of throughput times of the individual operations;
uniform capacity utilization of all involved individuals.

This results in coordination tasks between the robots and humans which are actively supported by technical devices, or control systems and organizational measures.

Host System.

The host system determines which tasks must be handled by what time at latest. The host system is responsible for all necessary materials and resources being procured at the proper time and thus for the assigned tasks being able to be performed within the deadline.

Control System.

The control system determines the segmentation of the individual operations. The control system coordinates all mobile robots, humans and automatic devices (elements of the collaborative system) so that all operations can be optimally performed.

The control system knows the exact locations of the individual commodity units in the space and also the location of each human and of each robot. The control system moreover also knows the current state of each automatic device.

The control system determines which operation is assigned to which robot. The control system determines which the next activities of the different individuals are, or that of each individual person.

KE(I) Robot.

The robot communicates continuously with the control system. On the one hand, in order to receive information about the assigned operation, but on the other hand also to continuously report back the current progress of the assigned operations to the control system. At the same time the robot also continuously reports its state and location in space to the control system.

KE(II) Human.

The individual is equipped with communications devices so that communication between the human and control system takes place without interruption, or continuously. The same communications device is equipped such that the location of each individual person can be determined continuously and seamlessly by the control system.

KE(III) Automatic Device.

Analogous to the robot, except with respect to the location, since it can be fixed.

Figure 3:
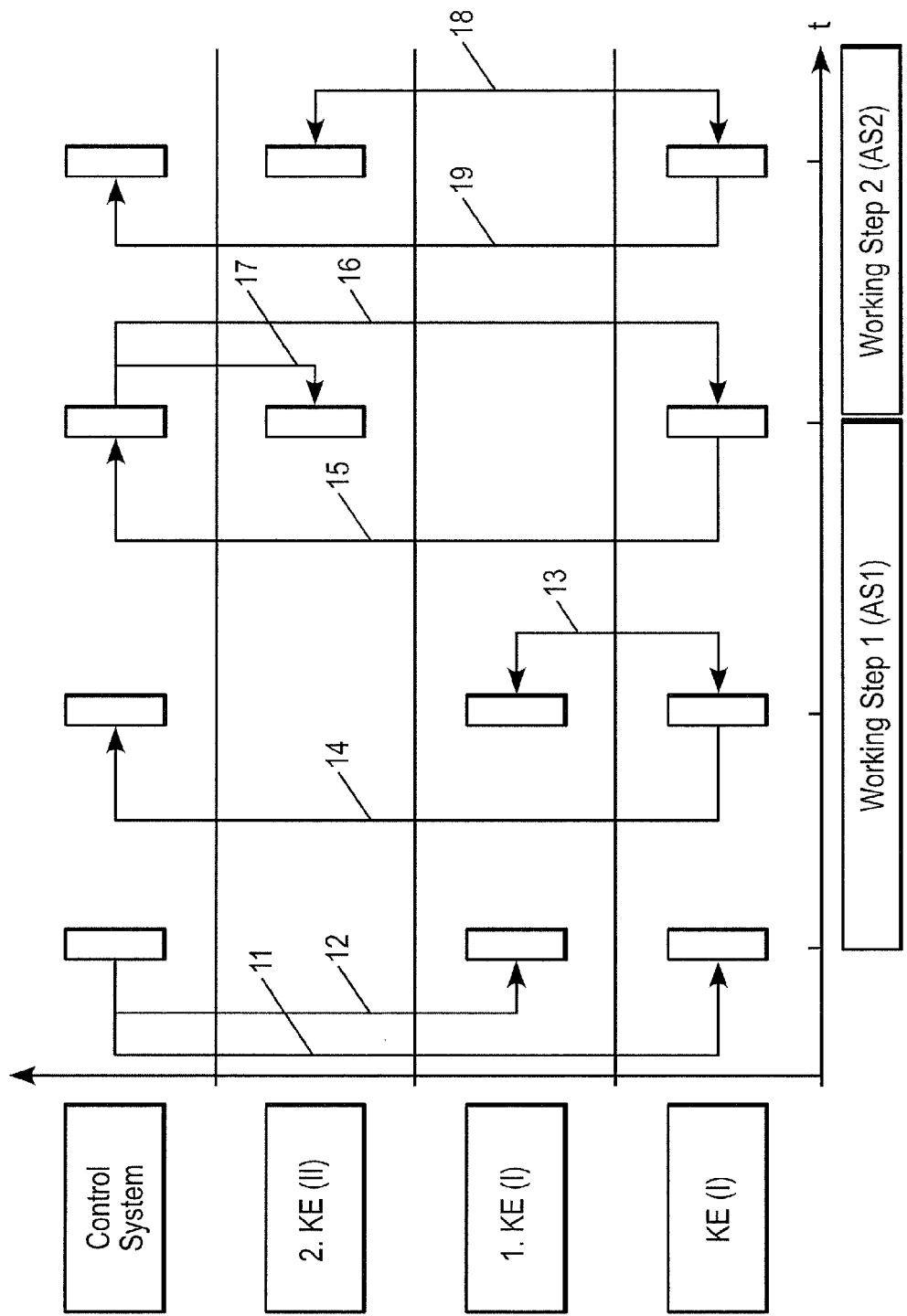
FIG. 3 shows a transaction diagram of one sequence of dynamic automation

FIG. 3 shows a transaction diagram of a sequence of dynamic automation.

A first and second working step AS1 and AS2 are plotted in succession in time on the time axis. On the y-axis the following are listed: The control system, a first KE(II), a 2nd KE(II) and a KE(I). In the first working step the commands 11, 12 pass from the control system to KE(I) and first KE(II) to move into a first execution zone. Next, in the working step AS1 the information flow 13 which is necessary between KE(I) and the first KE(II) for execution of the working step AS1 takes place, the command 14 to start taking place from the control system. Monitoring by KE(I) with acknowledgement 15 to the control system forms the termination of the working step AS1. In the second working step commands 16, 17 to KE(I) and the second KE(II) to move into a second execution zone proceed from the control system. Next, in the working step AS2 the information flow 18 which is necessary between KE(I) and the second KE(II) for execution of the working step AS2 takes place, the command 19 to start taking place from the control system. Monitoring by KE(I) with acknowledgement to the control system (no longer shown) forms the termination of the working step AS2.

Determination of the Location of Static Resources in the Space.

Based on extrapolations, predictions or bookings of orders, the control system determines the locations of all static resources in space. The locations and set of individual resources are fixed as a weighted, nonlinear combination of the following criteria:

- optimization of the paths which individuals must traverse in order to reach the different execution zones;
- optimization of the paths which the other mobile resources must traverse in order to reach the execution zones;
- reduction of refilling processes of those commodities which are used during execution of the corresponding tasks;
- reduction of the possibility of collisions of all mobile robots;
- increasing the parallelism of execution: if the same commodity is present distributed at several locations, all tasks which require this commodity can be executed in parallel.

The location of the static resources is computed continuously and dynamically: When a location becomes free, its re-occupation is recomputed according to the aforementioned criteria plus the current state of the collaborative system.

The location of the static resources is recomputed at the start of a planning period.

Dynamic Assignment (Scheduling).

The assignment of tasks to the mobile robots takes place dynamically. The choice of the next task is determined by the following:

- sequence of tasks: This is determined based on the latest possible execution deadline contained in the task;
- dependency on other tasks if the execution of other tasks is a precondition for the execution of a task;
- availability of the resources which are necessary for the task;
- location of the robots relative to the necessary, fixed resources.

Thus it is determined which article of the task must be supplied or produced on which mobile robot. Thus the set of task items is determined which must be carried out in order to supply or produce the article. The sequence of execution of the task item is not yet determined at this time.

Dynamic Determination of the Next Task Item.

The arrangement of which task item must be carried out takes place:

- after the assignment of an article to a mobile robot;
- immediately after the task item has been executed or completed.

The set of possible task items of an article is determined by the sequence numbers of the task items still to be executed. The choice from this set is subject to the following criteria:

- current availability of mobile and static resources;
- minimization of the paths which the required mobile resources must traverse (based on the current locations). If the required fixed resource is available at various locations, the execution zone is also established using this criterion (read "static resource");
- uniform capacity utilization of individuals;
- uniform capacity utilization of all resources; all KE(I) and KE(III).

Arrival of all Mobile Resources in the Execution Zone.

The control system is responsible for the prompt arrival of all mobile resources in the execution zone. To enable this, the next task item and its execution zone are prepared during the execution of the current task item, but are not yet definitively established. Thus the existing free (task-free) mobile resources are directed to the "in preparation" execution zone. In the preparation, the same criteria are used as in the determination of the next task item. Here the following fundamental rule applies: It is not the current state of all required resources which is noted, but the probable state at the instant of execution. As soon as a prepared mobile resource becomes free, it is immediately routed to the "in preparation" execution zone.

One embodiment for dynamic automation in warehouse logistics is described below. The description is limited here to a logistics process, specifically to commissioning, for the sake of simplification of the description (it should not be understood as conclusive).

Commissioning with Collaborative Elements.

The definitions for a logistical environment are translated below:

1. A task in commissioning corresponds to a shipping task. It is provided with a delivery deadline and a delivery address.
2. The task item of a shipping task describes which commodity with which properties in which amount must be delivered. The working step in this case includes packaging the commodity such that it is prepared for shipping. The task items can have a sequence number. It describes the logic for stacking of the commodity: A heavy commodity is commissioned first.
3. Static resources in this case are commodities which are stored in fixed resources.
4. Mobile resources are mobile robots.
5. Fixed resources are shelves, storage areas, labelling stations, high-bay warehouses, etc.
6. Commodities are the products which are to be commissioned.
7. Equipment: Is seldom used in this process. Examples are: price printing machines.
8. The article is the shipping unit.

Determination of the Storage Location of the Commodity in the Commissioning Warehouse.

The storage location of the commodity in the warehouse is determined based on extrapolations, predictions and advance notices of the shipping tasks. The same commodity can also be stored at several locations. The storage location and amount of the commodity to be stored are determined by a nonlinear combination of the following criteria:

- uniform distribution of future picking processes throughout the space;
- reduction of refilling processes during commissioning;
- parallelism: A commodity which is used very often is distributed among several storage locations.

The determination of the storage locations takes place dynamically, also during commissioning and during refilling.

Dynamic Assignment (Scheduling)

The assignment of the tasks to the mobile robots takes place dynamically. The choice of the next task is determined by:

- The sequence of tasks: This is determined based on delivery deadlines which are contained in the task, and the corresponding priorities;

the availability of the commodity in the commissioning warehouse which are [sic] necessary for the task;

the location of the robots relative to the necessary, fixed resources.

With this step it is determined which shipping unit on which mobile robot must be supplied or produced. Thus the set of task items is determined which must be carried out in order to produce the shipping unit. The sequence of execution is not yet determined at this time.

With packing pattern logic it is possible to determine the amount of the shipping unit of a task beforehand: Thus all shipping units of a task can be assigned in parallel.

Dynamic Determination of the Next Task Item.

Which task item must be executed is established as follows:

After assignment of a shipping unit to a mobile robot;

immediately after a task item has been executed.

The set of possible task items of a shipping unit is determined by the sequence of task items which are still to be commissioned.

The choice from this set is subject to the following criteria:

current availability of individuals and the commodity;

minimization of the paths which the required individuals and mobile robots must traverse (based on the corresponding current locations). If the required commodity is available at various locations, it is established using this criterion where picking takes place;

uniform capacity utilization of individuals;

uniform capacity utilization of all resources.

Arrival of the Necessary Mobile Resources at the Picking Site.

The system is responsible both for punctual meeting (at the picking site) of the mobile robot with the shipping unit and also with the individual who must pick up the commodity. To enable this the next task item and its commodity (picking site) are prepared during the execution of the current location, but are not yet definitively established. It is checked whether the individual who commissions the current location is also suitable for the next task item, based on the following criteria:

The shortest path relative to all uncompleted task items: The same individual executes the next operation of this task only when this causes the shortest shift of the location of the individual;

waiting times of other individuals: Should there be individuals who are waiting very long for a job or an operation, these individuals are enlisted first.

Thus the free individuals present are directed to the "in-preparation" picking site. The same criteria are used in preparation as in the determination of the next task item.

Here the following fundamental rule applies: It is not the current state of all required resources which is noted, but the probable state at the instant of execution. As soon as a prepared mobile resource becomes free, it is immediately routed to the "in-preparation" execution zone.

Organizational Limitations.

This process can be limited by reasonable organizational measures. They are necessary under certain circumstances to make the working organization understandable to the individuals involved.

Other measures can be introduced based on specific, recurring topological properties of the work space (here the warehouse).

Picking Zone.

Generally one individual is working in a defined warehouse zone. This zone is defined based on the topology of the warehouse: One individual is generally working in a few warehouse aisles (aisles between shelves) and only leaves this zone when the picking processes in the warehouse occur very nonuniformly due to faulty planning.

Formation of Combinations of Mobile Robots.

It is assumed that the mobile robots are moving only in one direction of travel in one aisle. The direction of travel to be taken is exactly fixed when a first robot in fact arrives at a free aisle which is not occupied by robots. This direction of travel remains fixed as long as a mobile robot is in the warehouse aisle. Any additional robot enters this "occupied" aisle with a predetermined direction of travel; this leads to the formation of a combination of two or more mobile robots. It is assumed that mobile robots cannot overtake one another in a warehouse aisle. This assumption is based on known, common warehouse topologies.

Since normally a warehouse has long aisles, combinations of mobile robots form automatically.

The use of the above defined algorithm for determining the next activity of an individual can have the following hallmarks or features:

if a combination has formed in a warehouse aisle, the individual always moves in the opposite direction of travel (to the robot);

as soon as an individual has processed a location on a robot, he moves to the next robot which is waiting for commissioning;

if the first robot is waiting at the same location for further commissioning, the individual simply remains stationary;

the individual executes the next task item.

Assuming that two adjacent warehouse aisles are being serviced by two different persons, and that the direction of travel of the robot in one of these warehouse aisles is opposite the direction of travel of the robot in another warehouse aisle, a carousel, a so-called "collaborative commissioning carousel", is formed by these directions of travel.

The robots travel clockwise for example;

the two individuals move counterclockwise.

If in these warehouse aisles more than two individuals are being used, they can be put at any time into this carousel.

The invention claimed is:

1. A process for dynamic automation,
    wherein, in a space with resources for handling at least one working step for one task item, at least one collaborative element of type I is controlled by means of a control system into an execution zone, the at least one collaborative element of type I communicating with at least one collaborative element of type II and/or type III,
    wherein the at least one collaborative element of type II is controlled into the execution zone by means of the control system,
    wherein, after arrival of the collaborative elements in the execution zone, the at least one collaborative element of type II and/or of type III is instructed by the at least one collaborative element of type I via communications media to execute a partial article-forming step, the execution being monitored by the collaborative element of type I,
    wherein the execution comprises initiating, by the at least one collaborative element of type II and/or of type III, a formation of a partial article on a surface of the at least one collaborative element of type I, and
    wherein, after the execution, all collaborative elements are independently released relative to each other to be scheduled for a next working step.

2. The process as claimed in claim 1, wherein static, mobile and/or fixed resources are used as the resources.

3. The process as claimed in claim 2, wherein a choice of the execution zone is made depending on the static, mobile and/or fixed resources which are required for the working step.

4. The process as claimed in claim 1, wherein an operation to handle a task is formed by a sequence of at least two working steps.

5. The process as claimed in claim 4,
wherein at least two operations are executed in parallel,
wherein the control system determines which sequence of operations is executed with which collaborative elements of type I and determines which working step is executed as the next working step by the at least one collaborative element of type II and/or type III, and
wherein performance of all the collaborative elements is substantially maximized according to the determination of sequences of operations and the execution of the working step.

6. The process as claimed in claim 5,
wherein the performance is maximized by at least one criterion of maximization of the number of operations which are carried out per unit of time, minimization of all throughput times of the individual operations, and uniform capacity utilization of all collaborative elements of type II.

7. The process as claimed in claim 1,
wherein the collaborative elements communicate with the control system by bidirectional communications media.

8. The process as claimed in claim 1, wherein the locations of all collaborative elements are continually determined by the control system to be known at any predetermined time.

9. The process as claimed in claim 1, wherein a next operation, the next working step and a distribution of resources in space are dynamically determined by the control system, each task assignment taking place upon completion of a prior task assignment with additional consideration of a respective current state of each collaborative element.

10. The process as claimed in claim 1, wherein static resources of the resources are distributed in space such that operations are distributed as uniformly as possible both in time and also in space.

11. The process as claimed in claim 1, wherein a probable state at the instant of execution is used for computation of the controlling of the collaborative elements.

12. The process as claimed in claim 1, wherein different partial spaces of the space are assigned to the collaborative elements of type II.

13. The process as claimed in claim 12,
wherein the collaborative elements of type I move in a partial space only in one direction of travel, the direction of travel to be taken being substantially established when a first collaborative element of type I arrives in the partial space,
wherein this direction of travel remains fixed as long as a collaborative element of type I is still in the partial space, and
wherein an additional collaborative element of type I is moving in the partial space which is occupied with a predetermined direction of travel, to result in the formation of a combination of at least two collaborative elements of type I.

14. The process as claimed in claim 12,
wherein at least two collaborative elements of type I move in two adjacent partial spaces in opposite directions of travel,
wherein the partial spaces are serviced by at least two different collaborative elements of type II, and
wherein a carousel is formed by the directions of travel, and
wherein the collaborative elements of type I and type II move in opposite directions.

15. The process as claimed in claim 1, wherein the process is applied in logistics.

16. The process as claimed in claim 1, wherein the process is applied in warehouse logistics.

17. A control system for dynamic automation, comprising:
a processor configured to
segment at least one operation into at least one working step and coordinate plural collaborative elements, the segmentation and the coordination substantially optimizing the at least one operation,
control, in a space with resources for handling at least one working step for one task item of the at least one operation, at least one collaborative element of type I among the collaborative elements into an execution zone, the collaborative element of type I being configured to communicate with at least one collaborative element of type II and/or type III among the collaborative elements,
control the at least one collaborative element of type II into the execution zone,
instruct, after arrival of the collaborative elements in the execution zone, the at least one collaborative element of type II and/or the collaborative element of type III by the at least one collaborative element of type I via communications media to execute a partial article-forming step, the execution being monitored by the at least one collaborative element of type I,
wherein the execution comprises initiating, by the at least one collaborative element of type II and/or of type III, a formation of a partial article on a surface of the at least one collaborative element of type I, and
wherein, after the execution, all collaborative elements are independently released relative to each other to be scheduled for a next working step.

18. A control system as claimed in claim 17,
comprising communications media configured to instruct a current location of each collaborative element at any point in time, respectively.

19. A control system as claimed in claim 17,
wherein the communications media are bidirectional.

20. A control system as claimed in claim 17,
wherein a determination of a next operation and of the next working step and a distribution of resources in space are dynamically provided, each task assignment taking place upon completion of a prior task assignment with additional consideration of a respective current state of each collaborative element.

21. A control system as claimed in claim 17, wherein the processor is configured to determine a probable state for the instant of execution.

22. A process for dynamic automation, comprising:
controlling, in a space with resources for handling at least one working step for one task item, at least one collaborative element of type I into an execution zone, the at least one collaborative element of type I being configured to communicate with a collaborative element of type II;
instructing the collaborative element of type II to enter the execution zone;

instructing, after arrival of the at least one collaborative element of type I and the collaborative element of type II into the execution zone, the collaborative element of type II by the at least one collaborative element of type I via communications media to execute a partial article-forming step;

monitoring, in the at least one collaborative element of type I, the execution of the partial article forming step by the collaborative element of type II;

initiating, upon execution, a formation of a partial article on a surface of the at least one collaborative element of type I; and independently releasing, after execution, all collaborative elements relative to each other to be scheduled for a next working step.

\* \* \* \* \*